US012673895B2

(12) United States Patent
Bernert et al.

(10) Patent No.: US 12,673,895 B2
(45) Date of Patent: Jul. 7, 2026

(54) CONCRETE MIXTURE INCLUDING SOLID CARBON

(71) Applicant: Solid Carbon, Inc., McMinnville, OR (US)

(72) Inventors: Michael Bernert, West Linn, OR (US); John Mead, McMinnville, OR (US)

(73) Assignee: SOLID CARBON, INC., McMinnville, OR (US)

( * ) Notice: Subject to any disclaimer, the term of this patent is extended or adjusted under 35 U.S.C. 154(b) by 390 days.

(21) Appl. No.: 18/324,715

(22) Filed: May 26, 2023

(65) Prior Publication Data

US 2023/0382794 A1     Nov. 30, 2023

Related U.S. Application Data

(60) Provisional application No. 63/365,474, filed on May 27, 2022.

(51) Int. Cl.
| | |
|---|---|
| *C04B 18/04* | (2006.01) |
| *C04B 18/10* | (2006.01) |
| *C04B 28/04* | (2006.01) |
| *C04B 40/00* | (2006.01) |
| C04B 111/00 | (2006.01) |

(52) U.S. Cl.
CPC .............. *C04B 18/10* (2013.01); *C04B 28/04* (2013.01); *C04B 40/0046* (2013.01); *C04B 2111/00019* (2025.05)

(58) Field of Classification Search
CPC ..... C04B 18/10; C04B 28/04; C04B 40/0046; C04B 2111/00017; C04B 28/02; Y02W 30/91
See application file for complete search history.

(56) References Cited

U.S. PATENT DOCUMENTS

| | | | |
|---|---|---|---|
| 8,617,309 B1 | 12/2013 | Carney et al. | |
| 2001/0052307 A1 | 12/2001 | Pye et al. | |
| 2019/0345061 A1 | 11/2019 | Ofori-Boadu et al. | |
| 2020/0062646 A1* | 2/2020 | Ng ........................... | E04C 2/044 |
| 2022/0041948 A1 | 2/2022 | Hupfauf | |
| 2022/0135482 A1* | 5/2022 | Pegg ................... | C04B 16/0633 |
| | | | 524/8 |
| 2022/0298073 A1* | 9/2022 | Pecha ................... | C04B 18/068 |

OTHER PUBLICATIONS

Barissov Temirlan, Application of Biochar as Beneficial Additive in Concrete (2021), Department of Civil and Environmental Engineering: Thesis (Year: 2021).*
ASTM C33_C33M retrieved from https://img.antpedia.com/standard/files/pdfs_ora/20200926/ASTM%20C33-18.pdf (Year: 2025).*

(Continued)

*Primary Examiner* — Amber R Orlando
*Assistant Examiner* — Anastasia A. Kuvayskaya
(74) *Attorney, Agent, or Firm* — McCoy Russell LLP

(57) ABSTRACT

Systems and methods are provided for forming concrete including a solid carbon product. The concrete formulation includes binders, aggregates, water, and at least 1% by weight solid carbon product. The solid carbon product includes less than 75% carbon by weight and greater than 25% ash by weight.

15 Claims, 4 Drawing Sheets

(56) References Cited

OTHER PUBLICATIONS

Suarez-Riera, D. et al., "The use of Biochar to reduce the carbon footprint of cement-based materials," Procedia Structural Integrity, vol. 26, Jan. 2020, 12 pages.

Mensah, R. et al., "Biochar-Added Cementitious Materials-A Review on Mechanical, Thermal, and Environmental Properties," Stainability, vol. 13, No. 16, Aug. 20, 2021, 27 pages.

Barissov, T., "Application of Biochar as Beneficial Additive in Concrete," Civil and Environmental Engineering Masters Thesis, School of Engineering, University of Nebraska—Lincoln, Dec. 2021, 130 pages.

Alberty, M., "Remy Wines takes concrete action in Dayton," Oregonian Website, Available Online at https://www.pregonlive.com/wine/2022/03/remy-wines-takes-concrete-action-in-dayton.html, Mar. 15, 2022, 6 pages.

"Episode 73: Remy Wines: An Interview About Innovation," Apple Podcasts Website, Available Online at https://podcasts.apple.com/us/podcast/episode-73-remy-wines-an-interview-about-innovation/id1558960773?=1000554949379, Mar. 23, 2022, 1 page.

Gupta, S. et al., "Carbon sequestration in cementitious composites using biochar and fly ash—Effect on mechanical and durability properties," Construction and Building Materials, vol. 291, Jul. 12, 2021, 21 pages.

ISA Korean Intellectual Property Office, International Search Report Issued in Application No. PCT/US2023/023755, Sep. 19, 2023, WIPO, 3 pages.

ISA Korean Intellectual Property Office, Written Opinion of the International Searching Authority Issued in Application No. PCT/US2023/023755, Sep. 19, 2023, WIPO, 4 pages.

* cited by examiner

100

400

CONCRETE MIXTURE INCLUDING SOLID CARBON

CROSS-REFERENCE TO RELATED APPLICATIONS

The present application claims priority to U.S. Provisional Application No. 63/365,474, entitled "CONCRETE MIXTURE INCLUDING SOLID CARBON", and filed on May 27, 2022. The entire contents of the above-listed application are hereby incorporated by reference for all purposes.

BACKGROUND AND SUMMARY

Concrete may be one of the world's most used construction materials and may be formed from a mixture of fine and coarse aggregate materials bound together by cement (e.g., primary binder). Manufacturers and builders have recognized that use of concrete may result in undesirable carbon emissions and have developed methods for mitigating or neutralizing the carbon emissions. A majority of the carbon emissions associated with concrete may be due to a calcining process used to form the cement from raw mineral inputs.

Established methods to help reduce a carbon footprint of concrete include modifying the cement composition in order to reduce a calcination temperature, or reducing an amount of cement in a concrete formulation. To reduce an amount of cement, a secondary binder or other cementitious material that may not be calcined may replace some of the cement in the concrete formulation. Common secondary binders may include fly ash, slags, glass pozzolans, natural pozzolans, Kaolin, silica fume, among others, or mixtures thereof. Further, aggregate gradations (e.g., particle size distribution) may be selected for increased concrete strength, thereby reducing an amount of cement in the concrete mixture.

In addition to modification of cement production processes or an amount of cement in a concrete mixture, carbon sequestration has also been used to help mitigate the carbon footprint of concrete wherein carbon dioxide may be removed from the atmosphere and may then be stored within the concrete. Established methods of carbon sequestration in concrete include direct carbon dioxide injection during batching, use of recycled concrete or synthetic limestone as aggregates, or the addition of biogenic carbon (e.g., biochar) to the concrete.

The established methods described above may fall short of achieving a concrete product that is carbon neutral or carbon negative. For example, the carbon neutral or carbon negative materials used to replace cement may be used in limited quantities before a strength or other performance metrics of the concrete are degraded. Additionally or alternatively, implementation of some of the methods may result in costly equipment modifications, such as plant retrofits for enabling direct carbon dioxide injection. Further, methods and systems described above may be demonstrated at the lab scale, but may be inefficient or ineffectual when translated to a larger scale production environment. In particular, biochar may be an attractive material for physical sequestration of carbon in concrete. For this reason, high carbon biochar (e.g., having ≥60% carbon by weight) may be used in concrete formulation to maximize an amount of sequestered carbon per weight of biochar. However, such high carbon biochars may only be included in concrete at small amounts before performance metrics of the concrete may be degraded. Further, the established methods of incorporating biochar into concrete result in concrete where the carbon particles cannot be visually observed in the concrete due to small (e.g., <0.1 mm diameter) particle size.

The inventors have recognized the above mentioned drawbacks in the previous strategies for mitigating the carbon footprint of concrete and developed a solution to at least partially overcome the drawbacks. A formulation for concrete as described herein comprises binder, aggregate, water, and at least 1 wt. % solid carbon product. The solid carbon product may include less than 75% carbon by weight and greater than 25% ash by weight. In one example, the solid carbon product may be included in a concrete formulation at an amount sufficient for forming carbon neutral or carbon negative concrete. In an alternate example, the solid carbon product may be included in a concrete formulation in an amount sufficient to lower a global warming potential (GWP) of the concrete formulation below a threshold demanded by local regulations. Further, the concrete formulation may be compatible with existing concrete batching systems. Additionally, the solid carbon product may be used across a wide range of concrete formulae, selected based on desired concrete properties. Lastly, the solid carbon product may be introduced in a way that does not materially interfere with the performance of the concrete and thus the resulting concrete conforms with the requirements of American Society for Testing and Materials (ASTM) C494 Type S (ASTM C494M-19e1), covering performance admixtures that have positive attributes but do not otherwise interfere with the performance of the concrete. A wide range of concrete mixtures may further include the solid carbon product in addition to other binder modifications as described above to further reduce the carbon footprint. These formulations achieve at least 90% of the compressive strength of a control mix without solid carbon products (as measured at 3, 7 and 28 days), achieve at least 90% of the flexural strength of a control mix without solid carbon (as measured at 3, 7 and 28 days), cause no more than a 1 hour acceleration or 1 hour 30 minute delay in set time, achieve shrinkage of not more than 135% of the control mix, and have a relative durability factor of at least 80.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a formulation and method for concrete including biogenic carbon in a form of solid carbon particles. The most common characteristics of concrete constituents may be defined by relevant ASTM standards. Herein, the term primary binders may refer to hydraulic cements that conform to ASTM C150 (ASTM C150M-22), ASTM C595 (ASTM C595M-21) or ASTM C1157 (ASTM 1157M-20a). Secondary binders may refer to pozzolans or supplementary cementitious materials that are used in combination with the primary binder. Secondary binders may include fly ash, natural pozzolans that conform to ASTM C618 (ASTM C618-23e1), slag cements that conform to ASTM C989 (ASTM C989M-22), silica fume that conforms to ASTM C1242 (ASTMC1242-22c) or glass pozzolans that conform to ASTM C1866 (ASTM C1866M-20), or mixtures thereof. The term admixtures may be used herein to refer to air entraining admixtures, water-reducing admixtures, high-range water-reducing admixtures, accelerating admixtures, retarding admixtures or hydration control admixtures that conform to ASTM C260 (ASTM C260M-10a(2016) and C494. Coarse aggregates and fine aggregates as descried herein may refer to materials that conform to ASTM C33 (ASTM C33M-18).

Figure 1:
FIG. 1 shows an example of concrete formed from an exemplary embodiment of a solid carbon concrete formulation.
Figure 2:
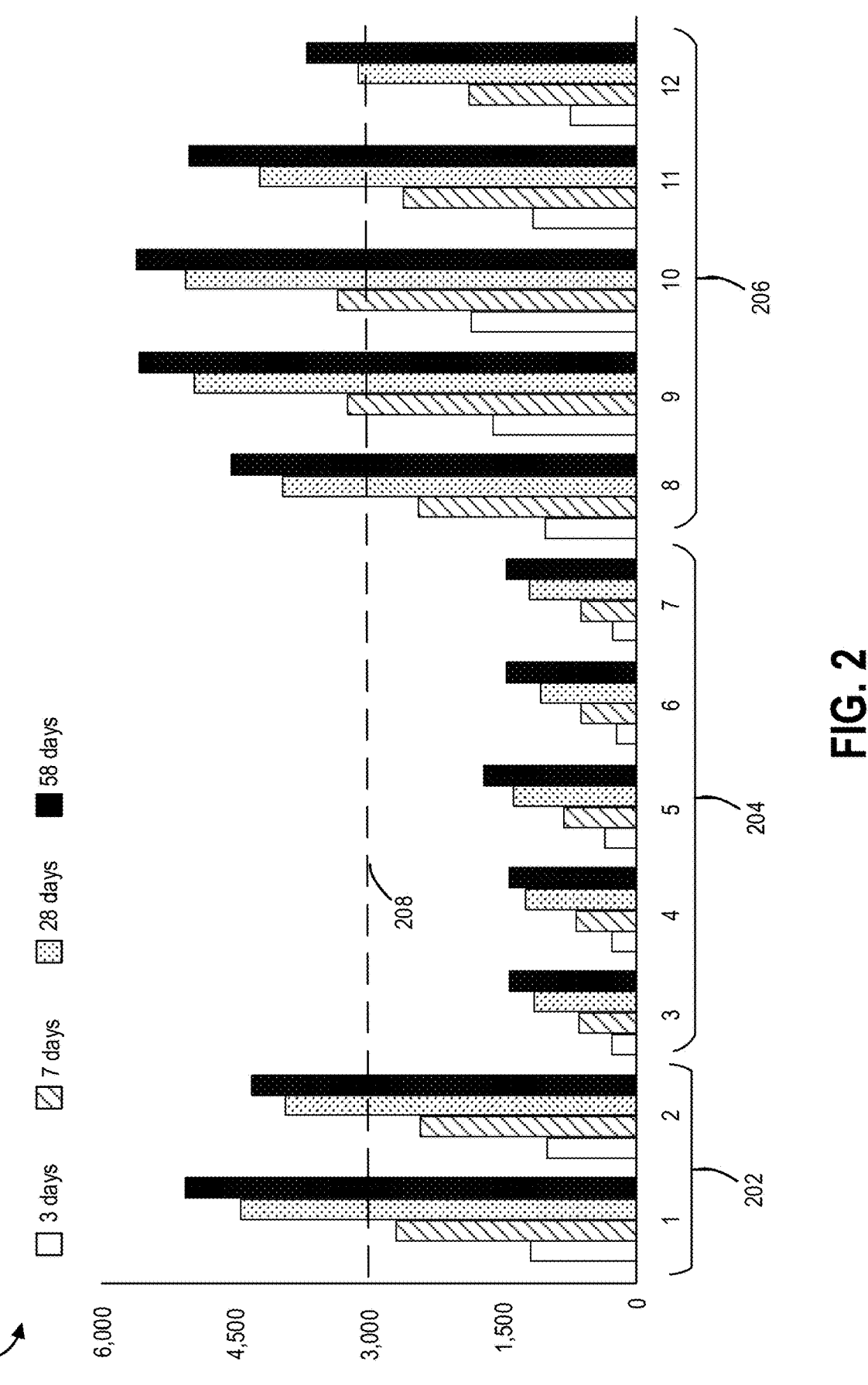
FIG. 2 shows a graph illustrating a compressive strength of concretes formed from a conventional concrete formulation, a concrete formulation including a biochar product, and a concrete formulation including a solid carbon product.
Figure 3:
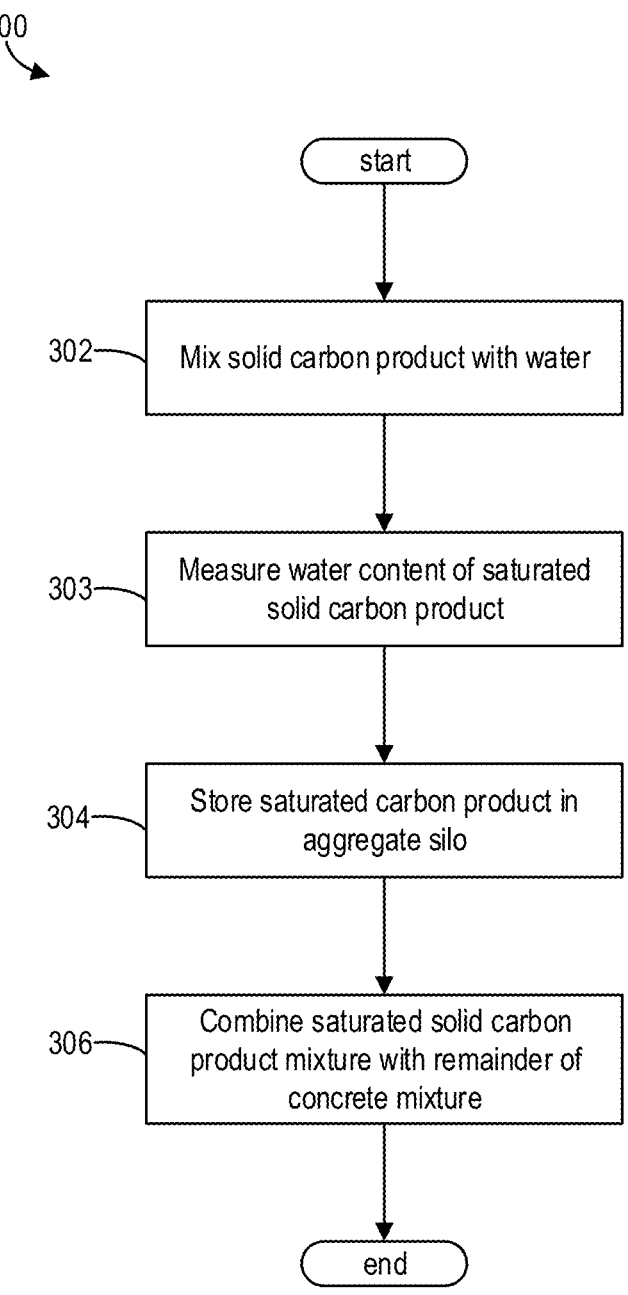
FIG. 3 shows an example a method for forming concrete from a concrete formulation including the solid carbon product.

A biogenic carbon source may be any source of carbon that comes from an organic origin, including: wood biomass, municipal biosolids, and agricultural crop waste, among others. The biogenic carbon source may be heat treated to be converted to a solid form through pyrolysis (e.g., heating in a low-oxygen environment) and/or combustion. Pyrolysis and/or combustion of biogenic carbon may result in a mixture of carbon particles and other minerals. The other minerals may be collectively referred to as ash. Conventionally, a biogenic carbon source that undergoes heat treatment (e.g., pyrolysis and/or combustion) may be referred to as biochar. Biochar may include materials with a carbon content of 75 wt. % to near 100 wt. %. A solid carbon product may also be obtained from a heat treated biogenic carbon source. However, the solid carbon product may include a carbon content less than 50%. In some examples, the solid carbon product may include less than 60% carbon by weight. A low carbon biochar or a high carbon ash may both be types of solid carbon product. In some examples, the solid carbon product may include carbon and ash from a plurality of biogenic carbon sources. An example of a concrete formed from a concrete mixture including a solid carbon product is shown in FIG. 1. A compressive strength of a concrete formed from the concrete mixture including the solid carbon product is shown in FIG. 2. Compressive strength data described herein may be collected using the methodology described by ASTM C39 (ASTM C39M-21) and other test properties may be described based on data that conforms to their relevant ASTM standard. For example, ASTM C666 (ASTM C666M-15) may be used for freeze/thaw testing. A method for forming concrete from the concrete mixture including the solid concrete product is shown in FIG. 3.

A concrete formulation including a solid carbon product may be a solid carbon concrete formulation and may include components at ranges described in table 1 below.

TABLE 1

Components of a solid carbon concrete formulation

| Formulation Constituent | Amount per cubic yard of concrete | Weight % |
|---|---|---|
| Primary binder | 100 lbs-450 lbs | 2-10 |
| Secondary binder | 100 lbs-450 lbs | 2-10 |

4

TABLE 1-continued

Components of a solid carbon concrete formulation

| Formulation Constituent | Amount per cubic yard of concrete | Weight % |
|---|---|---|
| Coarse aggregate | 1200 lbs-1800 lbs | 31-45 |
| Fine aggregate | 1200 lbs-1800 lbs | 31-45 |
| Admixtures | 0 oz/cwt-24 oz/cwt | <1 |
| Batch water | 24 gallons-36 gallons | 5-7 |
| Solid carbon product | 5 lbs-280 lbs | >0-7 |

A primary binder may be a type of cement including type 1 or type 2 Ordinary Portland Cement, Portland Limestone Cement, general use cement, or mixtures thereof. In one example, primary binder may be included the solid carbon concrete formulation in a range of 2 wt. % to 10 wt. %. Alternatively, the primary binder may be included in a range of 4 wt. % to 7 wt. %. In yet another example, the primary binder may be included in arrange of 5 wt. % to 6 wt. %. The solid carbon concrete formulation may include general use cement (conforming to ASTM C1157) with a global warming potential (GWP) value of less than 600 kg $CO_2$ equivalents per metric ton of material and interground limestone of between 15% to 25%. GWP may be discussed further below with respect to table 2. A secondary binder may be an additional binding material that is not cement including fly ash, silica fume, slag, glass pozzolans, natural pozzolans, or mixtures thereof as defined above. In one example, the secondary binder may be included in the solid carbon concrete formulation in a range of 2 wt. % to 10 wt. %. In some examples, the secondary binder may be included in the solid carbon concrete formulation in a range of 4 wt. % to 7wt. %. Alternatively, the secondary binder may be included in a range of 5 wt. % to 6 wt. %. Secondary binders may be included to enhance physical properties of the concrete and/or replace the primary binder with a material associated with fewer carbon emissions (e.g., lower GWP value).

The primary and secondary binders may work synergistically to bind together aggregates forming the concrete. The primary and secondary binders may be collectively referred to as cementitious material, cement factor, or a binder. In one example, secondary binders may make up between 40 wt. % and 70 wt. % of the total cementitious material of the solid carbon concrete formulation. In another example, secondary binders may make up between 50 wt. % and 60 wt. % of the total cementitious material. Minimizing an amount of primary binder may decrease a total amount of greenhouse gasses associated with the concrete formulation. Further, total cementitious materials may comprise between 4 wt. % and 20 wt. % of the solid carbon concrete formulation.

Coarse aggregates may include gravel, crushed stone, or mixtures thereof conforming to ASTM C33. Coarse aggregates may include particles sized greater than 1.8 mm. In one example, coarse aggregates may additionally or alternatively include recycled concrete aggregate which may be a form of sequestered carbon. In one example, coarse aggregates may be included in the solid carbon concrete formulation in a range of 31 wt. % to 45 wt. %. In some examples, coarse aggregates may be included in the solid carbon concrete formulation in a range of 34 wt. % to 40 wt. %. Alternatively, coarse aggregates may be included in a range of 36 wt. % to 38 wt. %. Fine aggregates may include sand and may confirm to ASTM C33. Fine aggregates may include particles sized less than 9.5 mm. In one example, fine aggregates may be included in the solid carbon concrete formulation in a range of 31 wt. % to 45 wt. %. In some examples, fine aggregates may be included in the solid carbon concrete formulation in a range of 34 wt. % to 40 wt. %. Alternatively, fine aggregates may be included in a range of 36 wt. % to 38 wt. %. Together, fine aggregates and coarse aggregates may be collectively referred to as aggregates. Aggregates may be included in a range of 62 wt.% to 90 wt. % of the solid carbon concrete formulation.

Admixtures may include water reducers, retarders, hardeners, shrinkage reducers, plasticizers, and other such materials which may be added to adjust physical properties of concrete formed by the concrete mixture. Admixtures may be included in a range of 0-24 fl. oz. per 100 lbs of total cementitious material. Overall, admixtures may make up less than 1 wt. % of the solid carbon concrete formulation.

The binders, aggregates, and additives of the solid carbon concrete formulation may be adjusted using customary methods, without accounting for the addition of solid carbon product. In other words, adjustments that would typically be made to a concrete formulation to obtain a desired physical property may be made in the same way when solid carbon product is included in the concrete formulation. Such flexibility is an advantage of the solid carbon concrete formulation. In one example the binders, aggregates, and additives may be chosen to minimize a carbon footprint of the solid carbon concrete formulation. Solid carbon product may be added to a given concrete formulation by substituting for fine aggregates on an equal weight basis. For example, a solid carbon concrete formulation may have 1,621 lbs of fine aggregates if solid carbon product was not added. To adjust the solid carbon concrete formulation to include 134 lbs solid carbon product, a weight of fine aggregates in the formulation is reduced by 134 lbs to 1,487 lbs.

Water requirements of the solid carbon concrete formulation may be calculated by treating the solid carbon product as a light weight aggregate (as defined by ASTM C330/ 330M-17a). Further, a weight percent of solid carbon product may be a weight of solid carbon product when saturated with water. As discussed below, the solid carbon product may increase in weight by 20% to 60% by absorption of water over a period of 24 hours. In one example, the solid carbon product may increase by at least 20% in weight by absorption of water. A batch water requirement may be calculated assuming the additional water absorbed by the solid carbon product may be available for hydration of the cement. In this way, a weight percent of solid carbon product in the concrete formula may be increased past what may be accomplished when solid carbon product is treated as a dry substitute for cementitious material.

Between 5 lbs and 270 lbs of solid carbon product as described above may be included per cubic yard (CY) of concrete. In one example, the solid carbon product may be included in at least 1 wt. % in the solid carbon concrete formulation. In alternate examples, the solid carbon product may be included in at least 3 wt. % in the solid carbon concrete formulation. In further examples, as shown in table 1, the solid carbon product may be between >0 wt. % and 7 wt. % of the solid carbon concrete formulation. Alternatively, the solid carbon product may be included at between 3 wt. % and 6 wt. %.

The solid carbon concrete formulation may have a global warming potential value of less than zero. Global warming potential (GWP) values may be calculated by method outlined by the Intergovernmental Panel on Climate Change (IPCC) or Product Category Rules (PCR) that conform to relevant International Organization for Standards (ISO) standards and may represent the impact of a material on absorption of energy in a global atmosphere relative to 1 kg of $CO_2$ gas. Specifically, relevant ISO standards may include ISO 14040, ISO 14044 and ISO 21930 as relates to the calculation of GWP. In other words, GWP may represent an amount of carbon or methane added to or diverted from the global atmosphere. A material such as the solid carbon product which may sequester carbon in a solid form may have a negative GWP value when accounting for either avoided methane emissions and/or biogenic carbon stored in the material. Summing the GWP values of the components of a material may be used to quantify a carbon footprint of a material. A GWP value of zero may be considered carbon neutral while a negative GWP may be considered carbon negative. Table 2 below shows an example of a solid carbon concrete formulation and corresponding GWP values.

As shown in table 2 below, components of the solid carbon concrete formulation, besides the solid carbon product, may have positive GWP values. The solid carbon product may include carbon sequestered from the atmosphere in a solid state and thus may have a negative GWP value. In this way, incorporation of 3 wt. % to 7 wt. % of a solid carbon product may result in a concrete sequestering the equivalent of 50 kg to 200 kg $CO_2$ from the atmosphere and a concrete formulation with a GWP value≤0 kg $CO_2$ per cubic yard of concrete. In alternate examples, the solid carbon product may be included between>0 wt. % and 7 wt. %. In such examples, the GWP of the solid carbon concrete formulation may be>0 kg $CO_2$ per cubic yard of concrete but may be below a threshold GWP demanded by relevant local regulations.

TABLE 2

An example of a solid carbon concrete
formulation and corresponding GWP values

| Mix Constituent | Amount per cubic yard of concrete | | GWP (kg $CO_2$ per cubic yard of concrete) |
|---|---|---|---|
| Primary binder | 283 | lbs | 86.24 |
| Secondary binder | 283 | lbs | 29.33 |
| Coarse aggregate | 1519 | lbs | 7.31 |
| Fine aggregate | 1478 | lbs | 7.11 |
| Water reducer | 3 | oz/cwt | 1.26 |
| High range water reducer | 3 | oz/cwt | 1.26 |
| Retarder | 6 | oz/cwt | 3.55 |
| Batch water | 30 | gallons | 0.68 |
| Solid carbon product | 134 | lbs | −182.57 |
| Total | | | −45.83 |

The solid carbon product may be formed of particles. The solid carbon product particles may have a gradation (e.g., particle size distribution) similar to the fine aggregates of the concrete formulation and larger than the binders. Further, the gradation of the solid carbon product may conform to ASTM C33 standard for fine aggregates. An example gradation of the solid carbon product is shown in table 3 below.

TABLE 3

An example gradation of solid carbon
product compared to ASTM C33 standard

| Sieve Size Sieve # | Specification Limits (% Passing) | | Solid Carbon Product Results |
|---|---|---|---|
| | Lower Limit | Upper Limit | |
| ⅜ | 100% | 100% | 100% |
| 4 | 90% | 100% | 100% |

TABLE 3-continued

| Sieve Size | Specification Limits (% Passing) | | Solid Carbon |
|---|---|---|---|
| Sieve # | Lower Limit | Upper Limit | Product Results |
| 8 | 70% | 100% | 94% |
| 16 | 50% | 85% | 61% |
| 30 | 25% | 60% | 28% |
| 50 | 5% | 30% | 14% |
| 100 | 0% | 10% | 7% |
| 200 | 0% | 4% | 3.8% |
| Fineness Modulus | 2.60 | 3.00 | 2.97 |

*An example gradation of solid carbon product compared to ASTM C33 standard*

In some examples, the gradation of the solid carbon product may be smaller than the fine aggregates. A sieving process may be used to adjust a gradation of the solid carbon product to a desired particle size range. The solid carbon product may have a bulk density between 600 and 1000 kg/m³. In one example, a bulk density of the solid carbon product may be between 700 and 900 kg/m³. In another example, a bulk density of the solid carbon product may be 800 kg/m³.

Conventionally, a biochar including greater than or equal to 60% carbon by weight may be used for a concrete formulation including sequestered carbon. However, a chemical composition of the solid carbon product may be between 30% and 75% carbon by weight and between 25% and 70% ash. In one example, the solid carbon product may have less than 60% carbon by weight and at greater than 40% ash by weight. In a further example the solid carbon product may have less than 75% carbon by weight and at greater than 25% ash by weight. In an alternate example, the solid carbon product may include less than 50% carbon by weight greater than 50% ash by weight. Ash may include any mineral components of the biogenic carbon source used to form the solid carbon product which may remain in the solid carbon product after heat treatment. In one example, an ash of the solid carbon product may predominately include calcium oxides, silicates, aluminates. Table 4 below shows an example of contents of an ash of a solid carbon product. Silicates, aluminates, calcium oxides, or mixtures thereof may comprise between 50% and 90% of the ash content of the solid carbon product. In one example, above listed ash constituents may comprise 60% of the ash content. A presence of chlorines in the ash of the solid carbon product may degrade a quality of the concrete. An elemental chlorine content of the ash may be less than 3% by weight. In this way, the solid carbon product may be included in the solid carbon concrete formulation at higher weight % than the high carbon biochar while still maintaining desirable properties of the concrete. The higher weight % of the solid carbon product may be partially attributed to a pozzolanic reaction between the ash fraction of the solid carbon product and calcium hydroxide in the cement paste.

TABLE 4

*Example of chemical make-up of an ash of the solid carbon product*

| Compound | Weight % |
|---|---|
| $SiO_2$ | 27.43 |
| $Al_2O_3$ | 12.19 |
| $TiO_2$ | 1.68 |
| $Fe_2O_3$ | 14.08 |

TABLE 4-continued

*Example of chemical make-up of an ash of the solid carbon product*

| Compound | Weight % |
|---|---|
| CaO | 14.10 |
| MgO | 3.17 |
| $Na_2O$ | 1.7 |
| $K_2O$ | 1.04 |
| $P_2O_5$ | 16.13 |
| $SO_3$ | 7.77 |
| Cl | 0.01 |
| $CO_2$ | 0.42 |

A higher ash content of the solid carbon product (when compared to conventional high carbon biochar) may correspond to a higher reactivity of the solid carbon product within the concrete mixture. The higher reactivity may be measured by customary methods such as pozzolanic reactivity tests and assist with a strength gain of the concrete. In one example, the solid carbon product may be classified as non-inert when tested using a cement cube test that conforms to ASTM C109 (ASTM C109M-21). The concrete formed from the solid carbon concrete formulation may have a strength activity index of at least 50 as measured by a cement cube test at 28 days.

The solid carbon product may be able to reversibly bind water. In on example, the solid carbon product may take up (e.g., absorb) between 20% and 60% of the solid carbon product dry weight in water. In alternate examples, the solid carbon product may take up at least 20%±5% of the solid carbon product dry weight in water. The water absorbed by the solid carbon product may be released during the curing process. In this way, the solid carbon product may act as an internal water source during the curing process and may reduce a shrinkage of the concrete during curing.

FIG. 1 shows an image 100 of a concrete test pillar formed from a first example of a solid carbon concrete formulation. Table 5 below shows an example of the solid carbon concrete formulation. The example may be the same as the example shown above with respect to table 2. In this way, image 100 may show a concrete pillar with a negative GWP value per cubic yard of concrete.

TABLE 5

*A first example of a solid carbon concrete formulation*

| Formulation Constituent | Amount per cubic yard of concrete | | Weight % |
|---|---|---|---|
| Primary binder | 283 | lbs | 7 |
| Secondary binder | 283 | lbs | 7 |
| Coarse aggregate | 1519 | lbs | 38 |
| Fine aggregate | 1478 | lbs | 37 |
| Water reducer | 3 | oz/cwt | <1 |
| High range water reducer | 3 | oz/cwt | <1 |
| Retarder | 6 | oz/cwt | <1 |
| Batch water | 30 | gallons | 6 |
| Solid carbon product | 134 | lbs | 3 |

Turning now to FIG. 2, a graph 200 is shown plotting compressive strength for concretes measured 2, 7, 28, and 58 days after mixing a concrete formulation. Compressive strength may be measured by the ASTM method C39. Each data set includes 4 bars, bars with white fill correspond to 2 days after mixing, bars with striped fill correspond to 7 days after mixing, bars with dotted fill correspond to 28 days after mixing, and bars with solid black fill correspond to 58 days after mixing. Data sets 1 and 2 included within bracket 202 may correspond to concrete formed from a reference concrete mixture that does not include solid carbon product. Data sets 3-7 within bracket 204 may correspond to concrete formed from a concrete formulation including a biochar product. The biochar product is a high carbon/low ash product, including between 60% and 80% carbon by weight. Data sets 8-12 within bracket 206 correspond to a concrete formed from a concrete formulation including a solid carbon product, such as the formulation of table 5, for example. The solid carbon product may be a high ash product, including less than 50% carbon by weight.

Line 208 indicates a compressive force of 3,000 psi. A compressive force above 3,000 and up to 5,000 psi, may be desirable for many applications. All data sets show increasing compressive force as curing proceeds (e.g., number of days after mixing increases). Reference data included within bracket 202 and the data sets included within bracket 206 including the solid carbon product formulation may both reach and surpass 3,000 psi compressive force by 28 days after mixing. By day 28, the data set included in 206 includes two tests that measured a compressive force above 4,500 psi. On the other hand, data set 204 including the biochar product does not reach 3,000 psi compressive force, even after 58 days.

As shown in FIG. 2, concrete including solid carbon product, such as concrete formed from the solid carbon concrete formulation discussed above with respect to table 1, may satisfy ASTM C494 Type S specifications, wherein the strength of the concrete including the solid carbon product may be at least 90% of the strength of the control without the solid carbon product. On the other hand, concrete including a high carbon biochar may not satisfy ASTM C494 Type S specifications. Furthermore, alternative methods to incorporate biochar into concrete may not satisfy ASTM C494 Type S for reasons other than the high carbon nature of the biochar. For example, some methods of incorporating biochar into concrete may decrease workability of the concrete and increase water demand of the concrete. Alternative methods often involve grinding of the biochar which increases the water demand and renders the biochar particles not observable in the concrete without magnification.

Figure 4:
FIG. 4 shows an image of ground finish of concrete showing the visually observable solid carbon product in the concrete without magnification.

By contrast, image 400 of FIG. 4 shows a polished area of concrete which may be formed from the solid carbon concrete formulation discussed above with respect to table 1. The concrete of FIG. 4 may include solid carbon product which conforms to ASTM C33 as described above with respect to table 3. Image 400 shows visible solid carbon particles in the polished area without magnification (e.g., visible to the naked eye). Such visible solid carbon particles may be greater than 0.05 mm in diameter. In alternate examples, the visible solid carbon particles may be greater than 0.1, 0.2, 0.5, or 1 mm in diameter.

Table 6 below shows a second and third example of the solid carbon concrete. Cement factor may be equivalent to a combination of primary binder and secondary binder. A primary binder of the third example formulation may be type 1-2 cement, the fine aggregate may be natural sand and the coarse aggregate may be crushed limestone. A primary binder of the second example formulation may be Portland-limestone cement, the fine aggregate and coarse aggregate may be the same as for the second example formulation. The third example formulation may have an increased weight % of solid carbon product compared to the second example. As described above, an amount of solid carbon product of the solid carbon concrete formulation may be increased by decreasing an equivalent amount of fine aggregate.

TABLE 6

| | A second and third example of the solid carbon concrete formulation | | | | |
|---|---|---|---|---|---|
| | Second Example | | | Third Example | |
| Formulation Constituent | Amount per cubic yard of concrete | Weight % | | Amount per cubic yard of concrete | Weight % |
| Cement factor | 521 lbs | 13 | | 514 | 13 |
| Solid carbon product | 50 lbs | 1 | | 100 | 2.5 |
| Fine aggregate | 1300 lbs | 33 | | 1250 | 32 |
| Coarse aggregate | 1750 lbs | 45 | | 1750 | 45 |
| Vinsol Resin | 11.5 fl. Oz | < 1 | | 8.1 | <1 |
| Water | 267 | 7 | | 280 | 7 |

The second example formulation and the third example formulation are each tested for performance including time of setting (ASTM C430), compressive strength (ASTM C39), flexural strength (ASTM C78), length change % (ASTM C157), and freeze-thaw resistance (ASTM 666) and compared to a control formulation that does not include solid carbon product. In both the second example formulation and third example formulation, the solid carbon product conforms to the standard of ASTM 494 Type S. The second example formulation was determined to be stronger than the control formulation in terms of early (e.g., as early as 3 days after mixing) compressive strength and flexural strength. Early compressive and flexural strength may be a desired property for contractors who may want to strip concrete forms sooner and generally increase a rate of construction progress.

Turning now to FIG. 3, A method 300 of preparing concrete including a solid carbon product is shown. Method 300 may be used to prepare a concrete formulation such as the solid carbon concrete formulation discussed above with respect to table 1. Method 300 may be performed using equipment found in a conventional concrete batching plant and without complex retrofitting of the concrete batching plant.

At 302, method 300 includes mixing the solid carbon product with water. The solid carbon product may be formed as described above, having a desired gradation, and minimally 50% ash content by weight. The amount of water may be between 20% and 60% the weight of the solid carbon product. In one example, the amount of water may be approximately (e.g., +/−5%) 30% the weight of the solid carbon product. Further, the amount of water may be sufficient to saturate the solid carbon product, thereby forming a saturated solid carbon product. In one example the solid carbon product may be mixed while water is added via overhead sprinklers. The mixture formed at 302 may be maintained in a wet state (e.g., saturated with water) until loading into the concrete plant. A wet state may be maintained by covering the mixture to avoid evaporation, or adding additional water to replace evaporated water. Said another way, an amount of water included in the mixture may be kept constant.

At 303, method 300 includes measuring a water content of the saturated solid carbon product. Step 303 may be performed within 24 hours of step 302. In one example, water content may be measured by collecting a sample of the saturated solid carbon, weighing the sample before and after baking off the water. Any water in excess of the measured water content the solid carbon product may be accounted for by adjusting an amount of batch water included in the concrete mixture.

At 304, method 300 includes storing the saturated solid carbon product formed at step 302 in an aggregate silo or bunker dedicated to the solid carbon product. The saturated solid carbon product may be transferred to the silo via a hopper fed aggregate loading belt. At 306, the saturated solid carbon product is combined with a remainder of the solid carbon concrete formulation in a mixing drum or concrete mixing truck. The solid carbon product may be stored in a saturated (e.g., wet) state for up to 3 month before combining with the remainder of the solid carbon concrete formulation with no adverse impact on the quality or performance of the concrete mixture. The remainder of the solid carbon concrete formulation may include primary binders, secondary binders, coarse aggregates, fine aggregates and batch water. The batch water may be adjusted to account for excess water as described above with respect step 303. Method 300 ends.

In this way, a solid carbon product may be included in concrete, sequestering carbon within the concrete and offsetting greenhouse gasses emitted by production of other concrete components. The solid carbon product, formed by heat treatment of a biogenic carbon source, may have physical and chemical properties allowing for incorporation of the solid carbon product at up to 7% by weight. The solid carbon product may be included with other components of a concrete formulation selected for minimal GWP value, resulting in concrete formulation that may be considered carbon neutral or carbon negative. Further, the solid carbon product may be included in a concrete forming process using equipment conventionally found in a concrete batch plant, thus minimizing a cost associated with using the concrete formulation including the solid carbon product.

The disclosure also provides support for a formulation for concrete comprising: a binder, an aggregate, water, and at least 1 wt. % of a solid carbon product, the solid carbon product comprised of less than 75% carbon by weight and greater than 25% ash by weight. In a first example of the system, the solid carbon product is a heat treated biogenic carbon source. In a second example of the system, optionally including the first example, the formulation has a global warming potential (GWP) value of equal to or less than zero and the GWP is calculated as weight of carbon and methane added to or diverted from a global atmosphere of by physical sequestration. In a third example of the system, optionally including one or both of the first and second examples, the concrete formed from the formulation conforms with requirements of American Society for Testing and Materials (ASTM) C494 Type S concrete. In a fourth example of the system, optionally including one or more or each of the first through third examples, the aggregate includes coarse aggregate comprised of particles sized greater than 1.8 mm and fine aggregate comprised of particle sized less than 9.5 mm. In a fifth example of the system, optionally including one or more or each of the first through fourth examples, a wt. % of the binder, a wt. % of the solid carbon product is between 1 wt. % and 7 wt. %, and a wt. % of a fine aggregate is between 31 wt. % and 45 wt. %. In a sixth example of the system, optionally including one or more or each of the first through fifth examples, the solid carbon product is less than 50% carbon by mass and greater than 50% ash by mass. In a seventh example of the system, optionally including one or more or each of the first through sixth examples, the solid carbon product has a bulk density between 800 kg/m$^3$ and 1000 kg/m$^3$. In a eighth example of the system, optionally including one or more or each of the first through seventh examples, the solid carbon product is less than 60% carbon by weight and an ash content of the solid carbon product includes greater than 50% by weight calcium oxides, silicates and aluminates. In a ninth example of the system, optionally including one or more or each of the first through eighth examples, a gradation of the solid carbon product conforms to ASTM C33.

The disclosure also provides support for a method, comprising: mixing a solid carbon product with water to form a saturated solid carbon product, wherein the solid carbon product is obtained from a heat treated biogenic carbon source and includes less than 75% carbon by weight, storing the saturated solid carbon product in an aggregate silo, and combining the saturated solid carbon product with a remainder of a concrete mixture. In a first example of the method, the remainder of the concrete mixture includes, primary binders, secondary binders, coarse aggregates, fine aggregates, and batch water. In a second example of the method, optionally including the first example, an amount of water in the saturated solid carbon product is kept constant until combining the saturated solid carbon product with the remainder of the concrete mixture. In a third example of the method, optionally including one or both of the first and second examples, the method further comprises: measuring a water content of the saturated solid carbon product within 24 hours of mixing the solid carbon product with water. In a fourth example of the method, optionally including one or more or each of the first through third examples, a weight of the water in the saturated solid carbon product is between 20% and 60% of the weight of the solid carbon product.

The disclosure also provides support for a formulation for concrete, comprising: cementitious material including primary binder and secondary binder, wherein the secondary binder is between 40 wt. % and 70 wt. % of the cementitious material, fine aggregate, coarse aggregate, water, and between 1 wt. % and 7 wt. % of a solid carbon product, wherein the solid carbon product is less than 75% carbon by weight and greater than 25% ash by weight. In a first example of the system, the solid carbon product is non-inert when tested using a cement cube test that conforms to ASTM C109 and includes less than 3% elemental chlorine by weight. In a second example of the system, optionally including the first example, the solid carbon product is visible without magnification when the concrete formed from the formulation is polished. In a third example of the system, optionally including one or both of the first and second examples, the solid carbon product is substituted for fine aggregates on an equal weight basis. In a fourth example of the system, optionally including one or more or each of the first through third examples, an amount of water of the formulation may be absorbed by the solid carbon product and is available for hydration of the concrete.

As used herein, the term "approximately" or "substantially" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A formulation for concrete, comprising:
a binder;
an aggregate;
water; and
at least 1 wt. % of a solid carbon product, the solid carbon product comprised of less than 75% carbon by weight and greater than 25% ash by weight, wherein the solid carbon product has a bulk density between 800 kg/m3 and 1000 kg/m3.

2. The formulation of claim 1, wherein the solid carbon product is a heat treated biogenic carbon source.

3. The formulation of claim 1, wherein the formulation has a global warming potential (GWP) value of equal to or less than zero and the GWP is calculated as weight of carbon and methane added to or diverted from a global atmosphere by physical sequestration.

4. The formulation of claim 1, wherein the solid carbon product conforms with requirements of American Society for Testing and Materials (ASTM) C494 Type S.

5. The formulation of claim 1, wherein the aggregate includes coarse aggregate comprised of particles sized greater than 1.8 mm and fine aggregate comprised of particle sized less than 9.5 mm.

6. The formulation of claim 1, wherein a wt. % of the binder is between 4 wt. % and 20 wt. %, a wt. % of the solid carbon product is between 1 wt. % and 7 wt. %, and a wt. % of a fine aggregate is between 31 wt. % and 45 wt. %.

7. The formulation of claim 1, wherein the solid carbon product is less than 50% carbon by mass and greater than 50% ash by mass.

8. The formulation of claim 1, wherein the solid carbon product is less than 60% carbon by weight and an ash content of the solid carbon product includes greater than 50% by weight calcium oxides, silicates and aluminates.

9. The formulation of claim 1, wherein a gradation of the solid carbon product conforms to ASTM C33.

10. A formulation for concrete, comprising:
cementitious material including primary binder and secondary binder, wherein the secondary binder is between 40 wt. % and 70 wt. % of the cementitious material;
fine aggregate;
coarse aggregate;
water; and
between 1 wt. % and 7 wt. % of a solid carbon product, wherein the solid carbon product is less than 75% carbon by weight and greater than 25% ash by weight, and wherein the solid carbon product has a bulk density between 800 kg/m3 and 1000 kg/m3.

11. The formulation of claim 10, wherein the solid carbon product is non-inert when tested using a cement cube test that conforms to ASTM C109 and includes less than 3% elemental chlorine by weight.

12. The formulation of claim 10, wherein the solid carbon product is visible without magnification when a concrete formed from the formulation is polished.

13. The formulation of claim 10, wherein the solid carbon product is substituted for fine aggregates on an equal weight basis.

14. The formulation of claim 10, wherein an amount of water of the formulation may be absorbed by the solid carbon product and is available for hydration of the concrete.

15. A formulation for concrete, comprising:
a binder;
an aggregate;
water; and
at least 1 wt. % of a solid carbon product, the solid carbon product comprised of less than 75% carbon by weight and greater than 25% ash by weight, wherein a bulk density of the solid carbon product is in a range of 600 kg/m$^3$ to 1000 kg/m$^3$.

\* \* \* \* \*